No. 747,011. PATENTED DEC. 15, 1903.
L. L. SMITH.
HEATING AND COOKING DEVICE.
APPLICATION FILED MAR. 17, 1903.
NO MODEL.
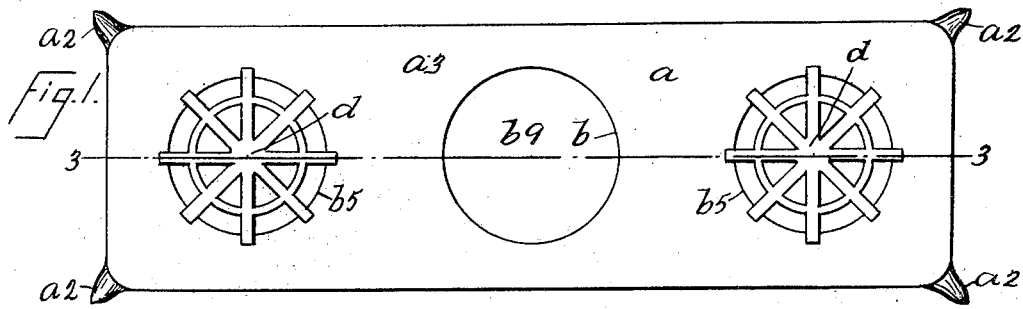
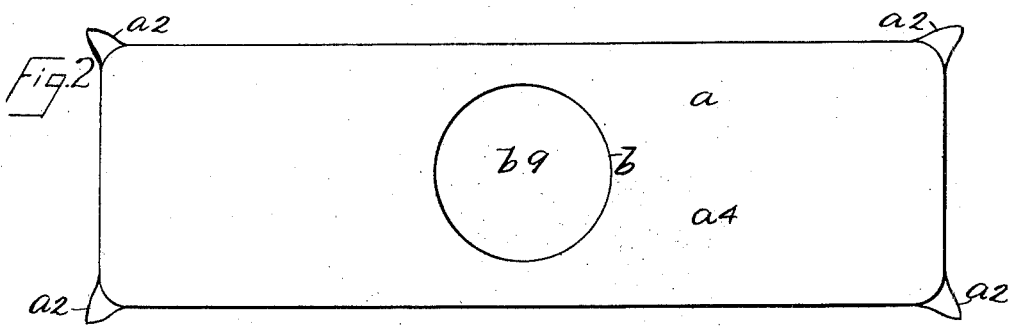
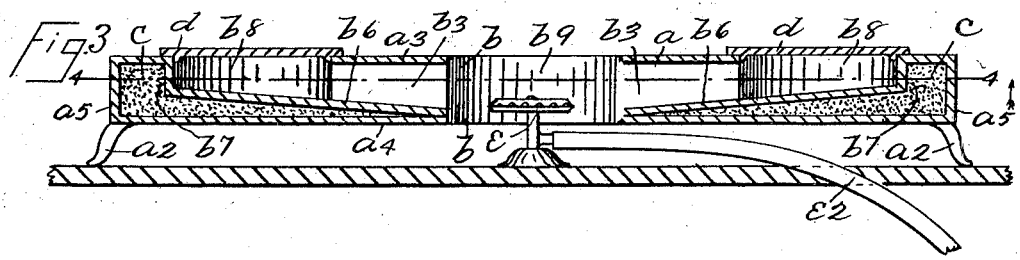
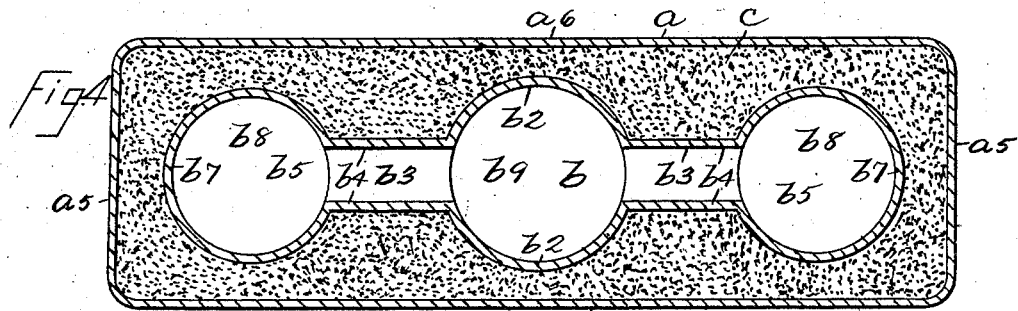
WITNESSES
INVENTOR
Louis Lum Smith
BY
Edgar Tate & Co.
ATTORNEYS No. 747,011. Patented December 15, 1903.

UNITED STATES PATENT OFFICE.

LOUIS LUM SMITH, OF NEW YORK, N. Y.

HEATING AND COOKING DEVICE.

SPECIFICATION forming part of Letters Patent No. 747,011, dated December 15, 1903.

Application filed March 17, 1903. Serial No. 148,161. (No model.)

*To all whom it may concern:*

Be it known that I, LOUIS LUM SMITH, a citizen of the United States, residing at New York, in the county of New York and State of New York, have invented certain new and useful Improvements in Heating and Cooking Devices, of which the following is a specification, such as will enable those skilled in the art to which it appertains to make and use the same.

The object of this invention is to provide an improved heating and cooking device designed for use in connection with an ordinary oil-burner, a gas-burner, or any other source of heat and which may be used for cooking many articles of food and also for heating water for various purposes, as well as the accomplishment of many other objects in housekeeping and common life, a further object being to provide a device of the class specified which may be placed on a table or other suitable support and over various kinds and classes of heaters, and which is simple in construction and operation and comparatively inexpensive, and by means of which a number of articles may be successfully cooked at the same time; and with these and other objects in view the invention consists in a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a plan view of my improved heating and cooking device; Fig. 2, a bottom plan view thereof; Fig. 3, a section on the line 3 3 of Fig. 1, and Fig. 4 a section on the line 4 4 of Fig. 3.

In the practice of my invention I provide a box-shaped casing $a$, which is preferably oblong and rectangular in form, and which may be composed of sheet metal or may be cast integrally, as desired, and which is also preferably provided at its corners with legs or other supports $a^2$. The casing $a$ is composed of a top $a^3$, a bottom $a^4$, end walls $a^5$, and side walls $a^6$, and the top and bottom members $a^3$ and $a^4$ are provided centrally with circular openings $b$, separated from the interior of the casing by segmental walls $b^2$, and laterally-directed passages $b^3$, formed by side walls $b^4$, and which communicate with supplemental openings $b^5$ in the top $a^3$ of the casing $a$. The passages $b^3$ are provided with bottoms $b^6$, which are preferably upwardly and outwardly inclined, and each of the openings $b^5$ is provided with a circular casing $b^7$, forming a circular space or chamber $b^8$, the bottom of which is formed by the bottom walls $b^6$ of the passages $b^3$, which are enlarged for this purpose.

The interior of the casing $a$ is filled in, as shown at $c$, with asbestos, mineral wool, or any suitable non-heat-conducting material, and this material is preferably packed closely around the circular casings $b^7$, which inclose the spaces or chambers $b^8$, and the bottom of said spaces and the bottom of the passages $b^3$ and also closely adjacent to the sides of said passages and the central circular casings or walls $b^2$, and in practice I also provide each of the openings $b^5$ in the top $a^3$ of the casing $a$ with a grating, spider, or similar device $d$, which rests loosely over the said openings on the top wall $a^3$ of said casing.

From the foregoing description it will be seen that the openings $b$ in the top and bottom of the casing $a$ and the segmental or circular walls $b^2$ form a circular space or opening $b^9$, which extends entirely through the device, and in Fig. 3 I have shown my improved heater and cooker placed on a table or other support $d$, and I have also shown at $e$ an ordinary gas-burner provided with a flexible tube $e^2$, by which gas may be supplied thereto, and in practice the burner $e$ may be placed on the table $d$ or on any other suitable support, and the heater or cooker may be placed thereover, as shown in Fig. 3, in which event the burner $e$ is in the central circular opening, as clearly shown in said figure, or the casing $a$ may be supported above said burner, if desired.

In using this device a vessel containing water to be heated or food to be cooked is placed over the central circular opening above the burner and rests on the top $a^3$ of the casing $a$, and other vessels containing other articles to be cooked may be placed on the spiders or grates $d$, and when the gas from the burner $e$ is ignited the heat will strike directly on the bottom of the central vessel and will be deflected outwardly through the passages $b^3$ and onto the bottoms of the vessels resting on the grates or spiders $d$, and the heat is also free to pass out around the edges of the grates or spiders, as will be readily understood. By means of this device a very high degree of heat is produced both directly over the burner $e$ and in the lateral chambers or spaces $b^8$, and the vessels over the grates or spiders $d$ will be heated almost as quickly and as highly as the vessel over the burner.

My invention is not limited to two of the passages $b^3$ and two of the circular spaces $b^8$ and corresponding openings $b^5$ in the top $a^3$ of the casing $a$, and any number of said passages, spaces, or chambers and openings may be employed, and the form of said casing instead of being oblong or rectangular may be square, circular, or of any other preferred shape.

It will be apparent that this device may be used over any kind or class of a burner, and it may be placed on or over an ordinary stove or heater having an opening in the top which will correspond with the central space or opening $b^9$.

Having fully described my invention, what I claim as new, and desire to secure by Letters Patent, is—

1. A device of the class specified, comprising a casing filled in with non-heat-conducting material, a central opening passing through said casing, and laterally-arranged openings in the top of said casing communicating with the central opening by means of passages, substantially as shown and described.

2. A device of the class described comprising an oblong casing having a central vertical opening, and the top of which is provided with laterally-arranged openings which are in communication with the central opening, said casing being packed with non-heat-conducting material, substantially as shown and described.

In testimony that I claim the foregoing as my invention I have signed my name, in presence of the subscribing witnesses, this 16th day of March, 1903.

LOUIS LUM SMITH.

Witnesses:
T. A. STEWART,
J. C. LARSEN.